May 24, 1966  C. L. TAYLOR  3,252,522
AGRICULTURAL TOOL CARRIER
Filed Dec. 17, 1962  6 Sheets-Sheet 1

INVENTOR.
Clyde L. Taylor
BY
Attorneys

May 24, 1966  C. L. TAYLOR  3,252,522
AGRICULTURAL TOOL CARRIER
Filed Dec. 17, 1962  6 Sheets-Sheet 2
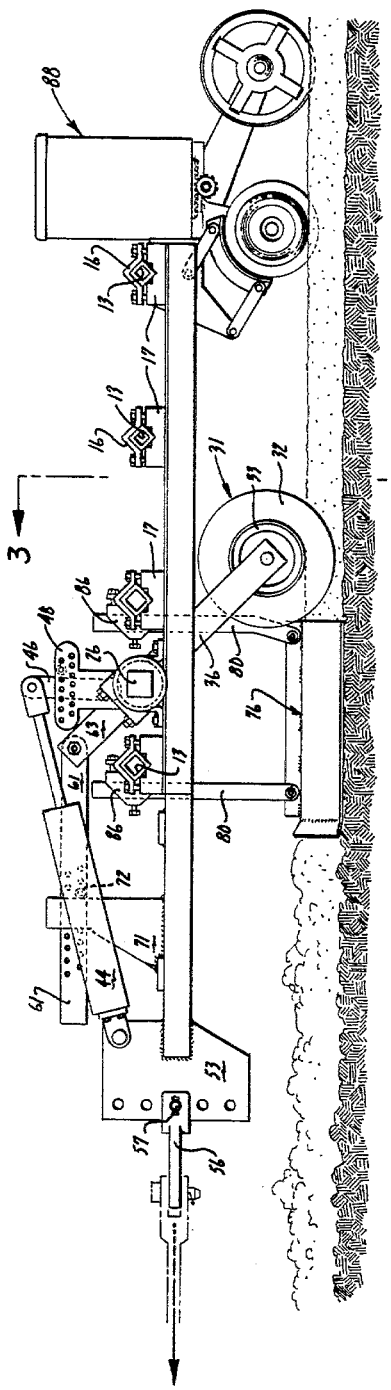
Fig. 2
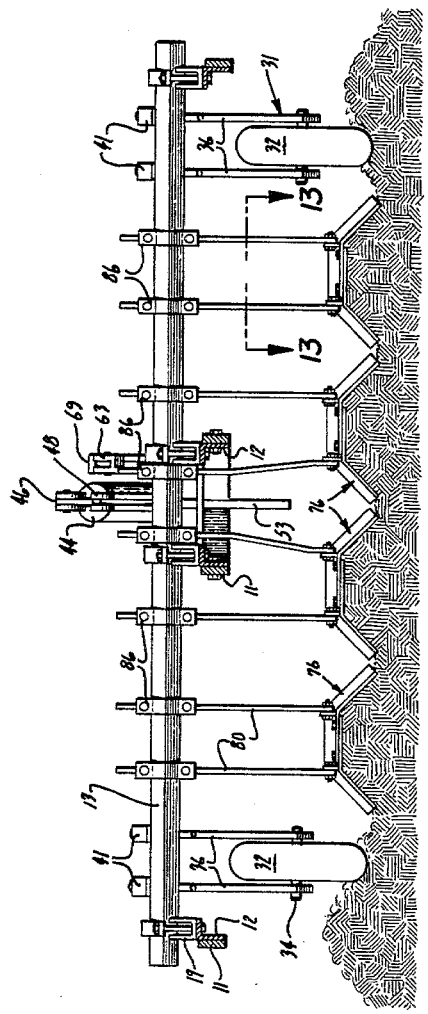
Fig. 3
INVENTOR.
Clyde L. Taylor
Attorneys

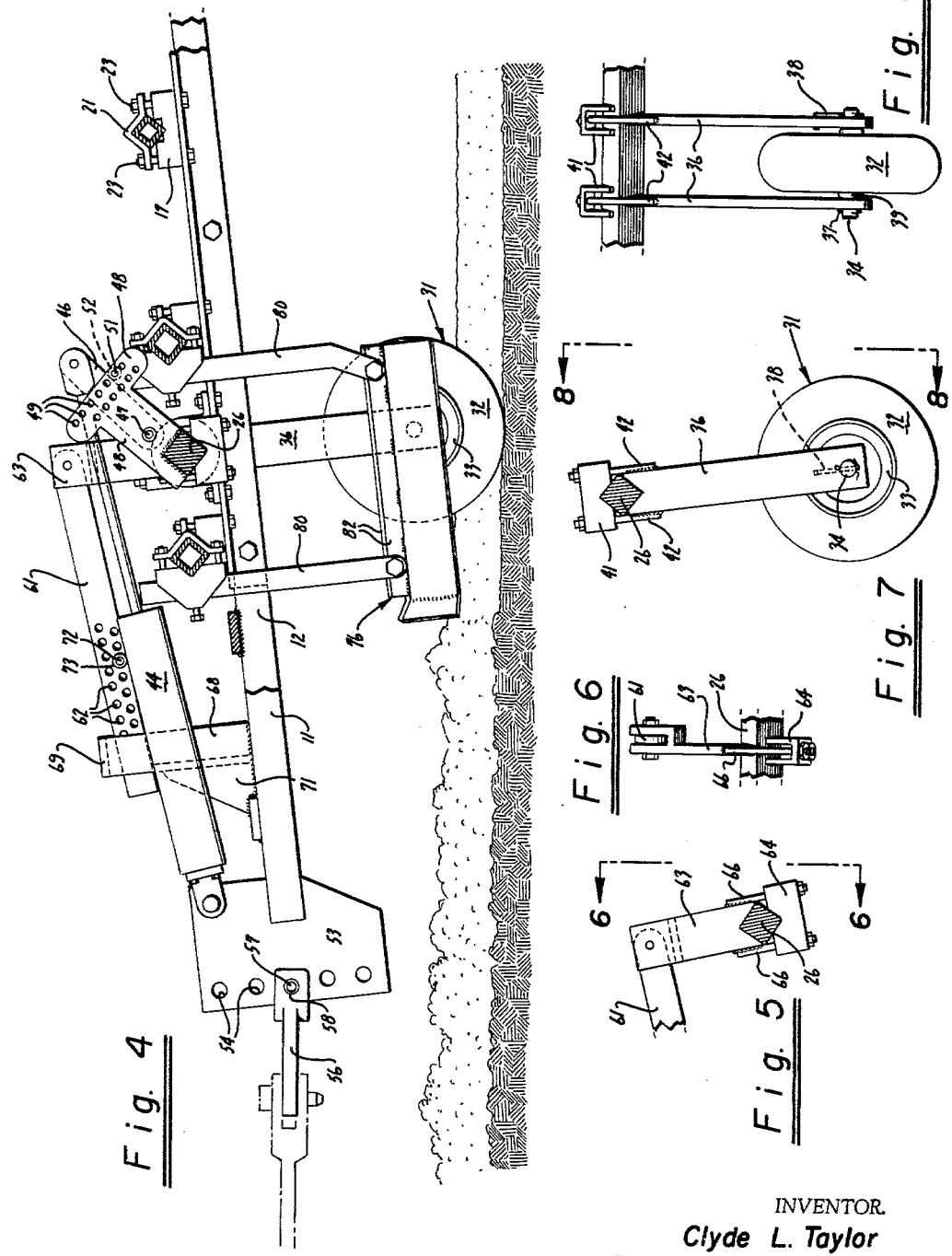

May 24, 1966  C. L. TAYLOR  3,252,522
AGRICULTURAL TOOL CARRIER
Filed Dec. 17, 1962  6 Sheets-Sheet 4

INVENTOR.
Clyde L. Taylor
BY
Attorneys

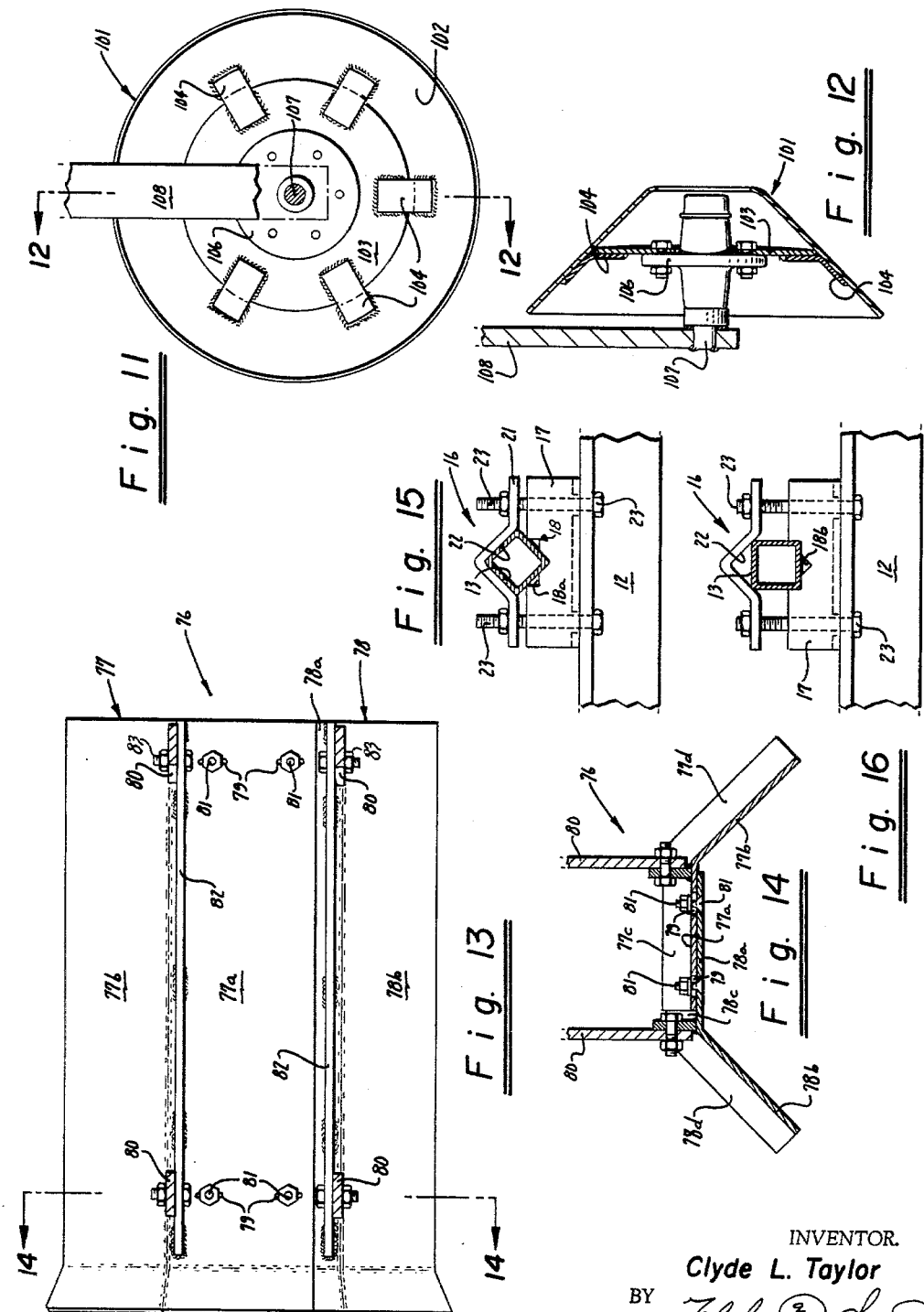

May 24, 1966   C. L. TAYLOR   3,252,522
AGRICULTURAL TOOL CARRIER

Filed Dec. 17, 1962   6 Sheets-Sheet 6

INVENTOR.
Clyde L. Taylor
BY
Attorneys

United States Patent Office 3,252,522
Patented May 24, 1966

3,252,522
AGRICULTURAL TOOL CARRIER
Clyde L. Taylor, 1545 S. Chinowith Road,
Visalia, Calif.
Filed Dec. 17, 1962, Ser. No. 245,147
8 Claims. (Cl. 172—414)

This invention relates to an agricultural tool carrier and more particularly to a tool carrier of this type which can be utilized for carrying a plurality of tools for performing multiple agricultural operations at the same time.

This application is a continuation-in-part of application Serial No. 184,086, filed April 2, 1962 now abandoned.

Agricultural tool carriers presently on the market have many disadvantages. In general, they are not constructed in such a manner that they can carry a large number of agricultural tools without difficulty. In addition, the tool carriers are constructed in such a manner that the agricultural tools are not readily adjustable on the tool carrier. Also, it has been difficult to obtain the desired results with such tool carriers. There is, therefore, a need for a new and improved agricultural tool carrier.

In general, it is an object of the present invention to provide an agricultural tool carrier which overcomes the above named disadvantages.

Another object of the invention is to provide a tool carrier of the above character which can be readily raised and lowered.

Another object of the invention is to provide a tool carrier of the above character in which the depth of penetrations of the tools can be readily adjusted.

Another object of the invention is to provide a tool carrier of the above character in which the tools can be readily attached and removed.

Another object of the invention is to provide a tool carrier of the above character with which beds of various widths can be formed.

Another object of the invention is to provide a tool carrier of the above character in which several different types of tools can be mounted upon the tool carrier at the same time.

Another object of the invention is to provide a tool carrier of the above character which has particularly novel means for guiding the same.

Another object of the invention is to provide a tool carrier of the above character in which certain of the parts can be reversed to obtain a greater height if desired.

Another object of the invention is to provide a tool carrier of the above character which can be readily and economically manufactured.

Additional objects and features of the invention will appear from the following description in which the preferred embodiment is set forth in detail in conjunction with the accompanying drawings.

Referring to the drawings:

FIGURE 2 is a side elevational view of the tool carrier shown in FIGURE 1 with bed shapers and planters mounted thereon.

FIGURE 3 is a cross-sectional view taken along the line 3—3 of FIGURE 2.

FIGURE 4 is a partial enlarged detail view of the tool carrier shown in FIGURE 2 in a raised position.

FIGURE 5 is a partial cross-sectional view taken along the line 5—5 of FIGURE 1 but with the tool carrier in the raised position as shown in FIGURE 4.

FIGURE 6 is a cross-sectional view looking along the line 6—6 of FIGURE 5.

FIGURE 7 is a cross-sectional view taken along the line 7—7 of FIGURE 1 but with the tool carrier in a raised position as shown in FIGURE 4.

FIGURE 8 is a view looking along the line 8—8 of FIGURE 7.

FIGURE 11 is an enlarged side elevational view of one of the guide wheels.

FIGURE 12 is a cross-sectional view taken along the line 12—12 of FIGURE 11.

FIGURE 13 is a cross-sectional view taken along the line 13—13 of FIGURE 3 showing one of my bed shapers used on the tool carrier.

FIGURE 14 is a cross-sectional view taken along the line 14—14 of FIGURE 13.

FIGURES 15 and 16 are cross-sectional views showing the manner in which the tool bars are held in place by the tool bar clamps.

In general, my agricultural tool carrier consists of a plurality of spaced parallel frame members and a plurality of spaced parallel tool bars which are removably mounted on the frame members so that they extend at right angles to the frame members. A rockshaft is rotatably mounted on the frame members parallel to the tool bars. At least two ground engaging wheels are mounted on the rockshaft in such a manner that they are spaced from the rockshaft. A lever arm is mounted on the rockshaft and hydraulic means connected to the lever arm and to the frame is provided for rotating the rockshaft and to cause movement of the ground engaging wheels to thereby raise and lower the tool bars with respect to the ground. Particularly novel means is provided for adjusting the depth to which the tools carried by the tool bars will be allowed to penetrate upon operation of the hydraulic means. Also, particularly novel means is provided for guiding the tool carrier as it is pulled by the tractor so that relatively precise agricultural operations can be accomplished with the tool carrier.

Figure 1:
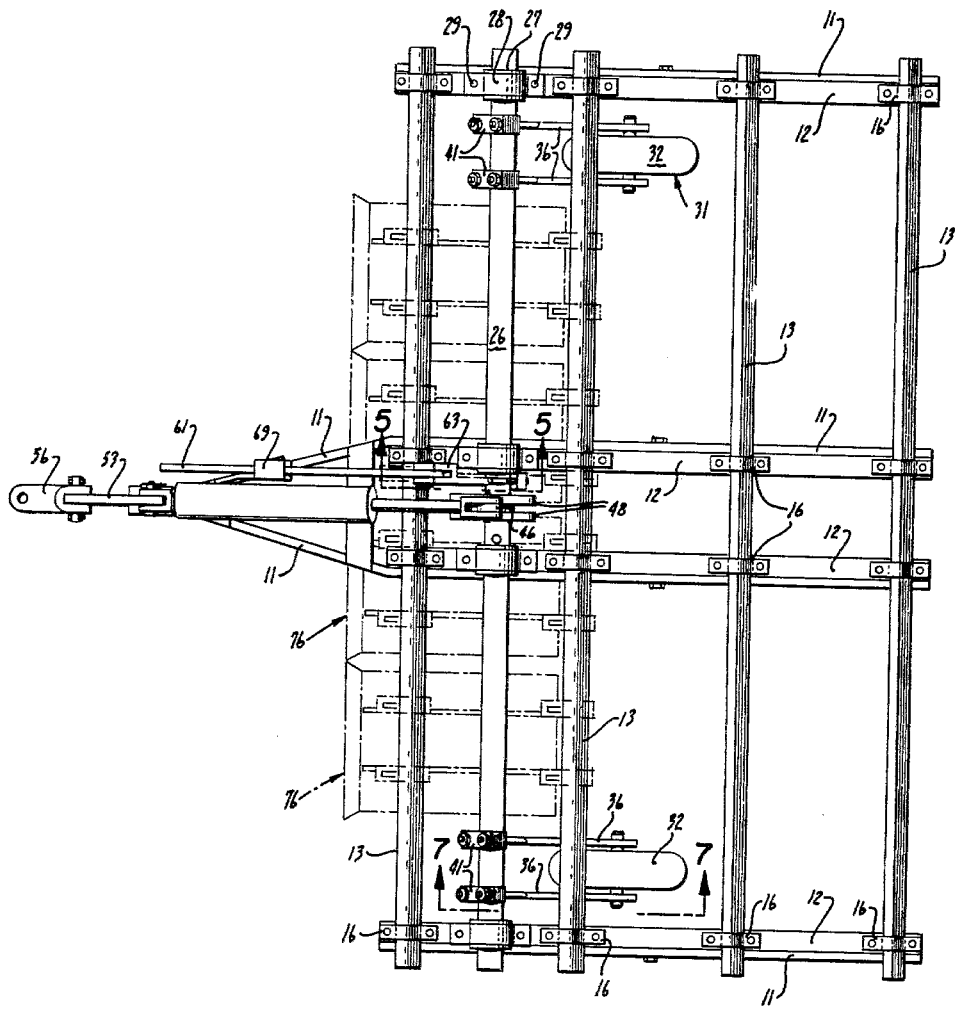
FIGURE 1 is a plan view of an agricultural tool carrier incorporating my invention.

As shown in FIGURE 1 of the drawings, my agricultural tool carrier consists of a plurality of spaced parallel bars 11 which normally extend in a direction which is parallel to the path of travel for the tool carrier. An L-shaped angle member 12 is secured to each of the bars 11 in a suitable manner such as by the use of bolts which extend through one of the legs of the L-shaped member and through the bar 11. The bars 11 and the members 12 form laterally spaced frame members for the tool carrier. A plurality of spaced parallel tool bars 13 are mounted upon the angle members 12 in such a manner that they extend at right angles to the angle members and also that they extend at right angles to the direction of travel for the tool carrier. The tool bars 13 can have any desired dimensions. For example, as shown in FIGURE 2, the two front tool bars have a greater cross-sectional area than the rear tool bars. In general, the tool bars should be dimensioned so that they are adequate to carry the tools desired. Thus, the two front tool bars 13 can be formed of tool steel 2 inches square, whereas the rear tool bars can be 1¾ inches square.

Bar clamps 16 are provided for removably securing the tool bars 13 to the angle members 12 and consists of U-shaped members 17 which rest upon one leg of the L-shaped angle members 12 as shown particularly in FIGURE 3. As shown particularly in FIGURES 15 and 16, the side walls of the U-shaped members 17 are provided with cut-outs 18 which have a U-shaped portion 18a which is dimensioned so that a tool bar can rest on the same with its side walls vertical. The cut-out is also provided with a V-shaped portion 18b which is adapted to receive one corner of a tool bar 13 as shown in FIGURE 15 to support the tool bar so that its sides extend at an angle of approximately 45° with respect to the angle members 12. Each of the bar clamps 16 also includes a bracket 21 which is provided with a V-shaped recess 22 dimensioned so that it will fit over the tool bar as shown particularly in FIGURE 15. The ends of the bracket are secured to the angle member 12 by suitable means such as bolts 23 which extend upwardly from the angle members 12 through the U-shaped members 17. As will be noted in FIGURES 15 and 16, this bracket 21 can be utilized for securing the tool bar 13 in either one of two positions.

A rockshaft 26 is rotatably mounted upon the angle members 12 and, as shown particularly in FIGURE 1, is positioned between the two front tool bars 13 and extends in a direction parallel to the tool bars 13. The rockshaft 26, as shown, is also square in cross-section. Means is provided for rotatably mounting the rockshaft upon each of the angle members 12 and consists of castings 27 which are provided with square holes which receive the rockshaft. The castings are provided with an external annular groove which receives a strap 28 which has its ends secured to the angle members 12 by suitable means such as bolts 29. As the rockshaft 26 is rotated, it will carry with it the castings 27 which will rotate within the straps. Thus, it can be seen that the means for mounting the rockshaft is similar to a pillow block.

At least two spaced ground engaging wheels 31 are carried by the rockshaft. In order to support heavy loads, the ground engaging wheels 31 can be of any suitable type such as airplane tires 32 which are mounted upon a rim 33. The rim carries a hub (not shown) of conventional construction. A bearing assembly, also of conventional construction, is mounted in the hub. A shaft 34 is mounted in the bearing assembly and extends outwardly from both sides of the hub. A pair of flat bars 36 have their lower ends mounted upon the shaft 34 as shown particularly in FIGURES 7 and 8. The shaft 34 is prevented from rotating by an L-shaped pin 38 which extends into the shaft and into a hole provided in one of the flat bars 36. Suitable means such as a cotter pin 37 is provided for retaining the other flat bar on the shaft spacers 39 are provided to properly space the lower ends of the flat bars 36 from the hub of the wheel. Each of the flat bars 36 is secured to the rockshaft 26 by suitable means such as U-shaped members 41 which are provided with V-shaped cutouts as shown particularly in FIGURE 7 to accommodate the rockshaft. Bolts 42 are secured to opposite sides of each of the flat bars 36 and extend upwardly through the U-shaped member 41 and serve to firmly but removably secure the flat bars 36 and the wheel 31 carried thereby to the rockshaft.

Means is provided for adjusting the angular position of the rockshaft 26 and consists of a hydraulic ram 44 in which one end (the piston) is pivotally connected to one end of a link 46. The lower end of the link 46 is pivotally connected at 47 between a pair of spaced parallel T-shaped adjustment plates 48 which are affixed to the rockshaft 26 by suitable means such as welding as shown particularly in FIGURE 4. The T-shaped adjustment plates 48 are provided with two rows of spaced holes 49. Means is mounted in the holes 49 for limiting the movement of the link 46 in a rearward direction for a purpose hereinafter described and consists of a bolt 51 which extends through the aligned holes in the adjustment plates 48. A spacer 52 is mounted between the plates 48 on the bolt 51 and is adapted to be engaged by the link 46.

The other end of the hydraulic ram (the cylinder) is pivotally connected to a front adjustment plate 53 which is secured between two of the flat bars 11 which have been inclined inwardly and forwardly as shown particularly in FIGURES 1 and 2. The front adjustment plate is provided with a plurality of vertically spaced holes 54. A tractor hitch 56 is adapted to be positioned in any one of the holes by means of a pin 57 which is held in place by suitable means such as cotter pins 58. This arrangement permits the front end of my agricultural tool carrier to be carried at any desired level with respect to the device which is being utilized for pulling the tool carrier and facilitates ready connection to the draw bar of the tractor. The hydraulic ram is double acting and is provided with suitable hydraulic connections e.g. hoses. A source of pressurized hydraulic fluid (not shown) is provided for operating the hydraulic ram. Such a source of hydraulic fluid is normally carried by the tractor.

Additional means is provided for controlling the positioning of the ground engaging wheels 31 and consists of an extension bar 61 which is provided with a plurality of holes 62 at its forward end. The rear end of the extension bar 61 is pivotally mounted in a yoke member 63 which is affixed to the rockshaft 26 by suitable means such as a U-shaped member 64 which has bolts 66 extending through the same and welded to the yoke 63. The forward end of the extension bar 61 is slidably received between a pair of upstanding bars 68 mounted on one of the bars 11. The upper extremities of the bars 68 are joined by a top plate 69 which serves as a top guide. A reinforcing plate 71 is also mounted on the same bar 11 between the two plates 68 and serves as a lower guide for the extension bar 61. A bolt 72 is adapted to be mounted in the holes 62 in the extension bar and carries sleeves 73 disposed on each side of the extension bar 61. The sleeves 73 are adapted to be engaged with the upstanding bars 68.

From the construction hereinbefore described, it can be seen that by adjusting the position of the bolt 72 in the holes 62, the extreme rearward position of the ground engaging wheels 31 can be determined. In the same way, the extreme forward position of the ground engaging wheels can be determined by positioning the bolt 51 in the desired holes 49 in the T-shaped adjustment members 48.

The tool carrier thus far described comprises the basic unit which is to be utilized for the various agricultural operations hereinafter described. Let it be assumed that it is desired to utilize the tool carrier for carrying bed shapers and planters to simultaneously carrying on bed shaping and planting operations. Bed shapers 76 are mounted on certain of the tool bars 13 as, for example, the front two tool bars of the tool carrier as shown particularly in FIGURES 2 and 3. The bed shapers are shown in detail in FIGURES 13 and 14 and consist of a pair of members 77 and 78 which form two half sections. The members 77 and 78 are formed with horizontal portions 77a and 78a, respectively, and downwardly inclined portions 77b and 78b. These portions are provided with forwardly and upwardly inclined portions 77a, 77d, 78c and 78d, respectively. In order to permit adjustment of the width of the bed formed by the bed shapers, one of the members 77 or 78 is provided with slots 79 through which flat-headed bolts 81 extend. As shown, particularly in FIGURE 14, the bolts 81 are utilized for holding the members 77 and 78 in the desired spaced apart adjusted positions.

Each of the bed shapers is provided with four vertical support bars 80 which are pivotally connected to opposite ends of a pair of horizontal bars 82 by suitable means such as bolts 83. The bars 82 are affixed to and extend longittudinally of the two half sections 77 and 78 of the bed shaper. As shown particularly in FIGURES 2 and 3, the support bars 80 extend upwardly and are secured to the tool bars 13 by bar clamps 86 of a conventional construction. As is well known to those skilled in the art, the bar clamps are formed so that they can be shifted longitudinally of the tool bars and clamped in any desired position and also so that the support bars extending upwardly through the same can be shifted vertically within the bar clamps and clamped in any desired position. Thus, it can be seen that the bed shapers can be spaced apart the desired distance on the tool bars and also can be positioned in any desired height with respect to the tool bars.

In forming the beds, the framework for the tool carrier which includes the tool bars is lowered sufficiently so that practically all of the weight of the tool carrier is supported by the bed shapers. This is desirable in order to obtain the necessary compaction of the beds being formed by the bed shapers. The forwardly and upwardly turned portions of the bed shapers give a funnelling action as the beds are being formed and make it possible to obtain better compaction of the beds. It will be noted as shown in FIGURE 2 that the extent to which the bed shapers support the weight of the tool carrier can be controlled by the positioning of the bolt 72 in such a manner so that it engages the upstanding bars 68 as shown particularly in FIGURE 2. In this way the load can be distributed as desired between the wheels 31 and the bed shapers.

During the time that the beds are being shaped, it may be desirable to accomplish a number of other operations. For example, it may be desirable to place fertilizer in the beds and to thereafter plant seeds in the beds. Thus, as shown in FIGURE 2, planters 88 of a conventional type can be mounted on the rear tool bar 13 as shown. If desired, additional equipment can also be mounted on the tool carrier.

The tool carrier can be provided in various widths as, for example, 16, 18, 20 and 21 ft. to form a desired number of beds as, for example, six beds. Also, it is readily apparent that, if desired, it is possible to arrange the planters and bed shapers in such a manner that it is possible to plant two rows and skip two rows, or to skip four rows and plant four rows. Alternatively, one planter can be provided for each of the beds formed. It has been found that my tool carrier is sturdy enough so that it can carry large tanks of liquid fertilizer if desired to feed fertilizer through fertilizer shanks mounted on other of the tool bars for fertilizing while planting. Dry fertilizer applicators can also be used if desired.

In mounting certain tools, it may be desirable to remove certain of the tool bars. This can be readily accomplished by removing the bar clamps securing the bars to the frame members.

From the foregoing, it can be seen that with my tool carrier, it is possible for the farmer to accomplish a number of operations with only one pass through the field. The tool carrier is made in such a manner that it can be readily raised out of the ground and turned around for the next pass through the field.

Figure 9:
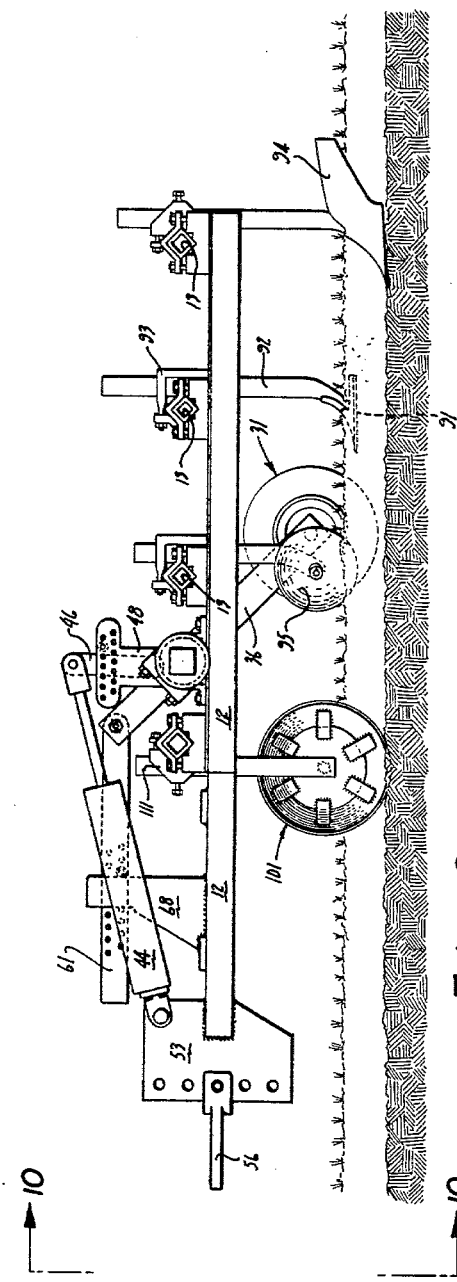
FIGURE 9 is a side elevational view of my tool carrier with cultivating tools mounted thereon and with particularly novel guide wheels for guiding the tool carrier during the cultivation operation.
Figure 10:
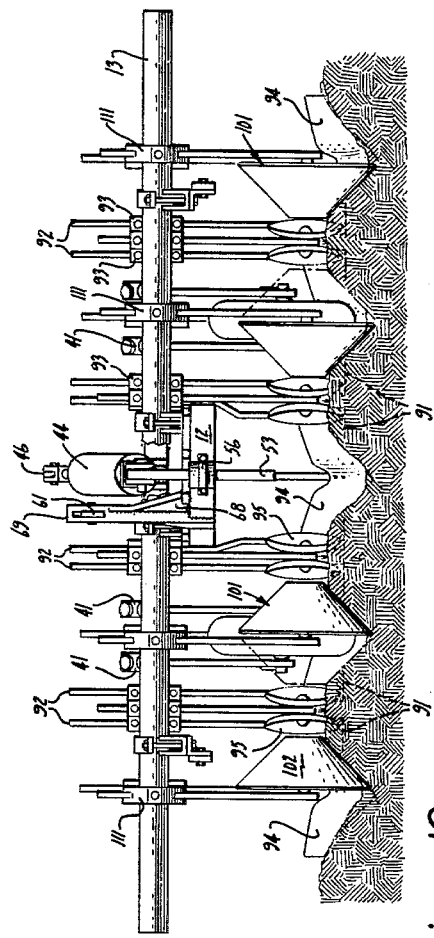
FIGURE 10 is a front elevational view of the tool carrier shown in FIGURE 9.

Now let it be assumed that it is desired to utilize the tool carrier for a cultivating operation such as that shown in FIGURES 9 and 10. The tool carrier can be provided with a large number and variety of ground working tools. Thus, as shown, the tool carrier can be provided with sweeps 91 which are mounted on supporting bars 92 carried by bar clamps 93 removably secured to the tool bars 13. Also as shown, the tool carrier can be provided with disc hillers 95 and furrowers 94 which are mounted on the tool bars in a similar manner.

In order to guide the tool carrier very precisely during the cultivating or ground working operation, I have provided my tool carrier with particularly novel means in the form of cone-shaped guide wheels 101. The cone-shaped guide wheels 101 are shown in detail in FIGURES 11 and 12 and, as shown particularly in those figures, each consists of a truncated cone-like member 102 which is open at both ends. A supporting rim 103 is mounted intermediate the ends of the number 102 and is secured to the cone-like member 102 by brackets 104 which are welded to the cone-like member and to the rim as shown particularly in FIGURES 11 and 12. A flanged hub 106 is secured to the rim and is provided with a rotatable shaft 107. A support bar 108 has its lower extremity affixed to the shaft 107 and is secured to a tool bar 13 by suitable means such as a bar clamp 111.

The cone-shaped guide wheels can be mounted in any position on the tool carrier. For example, as shown in FIGURES 9 and 10, they can be mounted on the front tool bar. It is desired to provide at least two of these cone-shaped guide wheels on the tool carrier which face in opposite directions so that they serve to apply substantially equal and opposite forces to the tool carrier to guide it as it is pulled down the rows being cultivated. It will be noted that the cone-shaped guide wheels have the same contour as the contour of the sides of the beds. Since this is the case, the cone-shaped guide wheels do not cut into the ground but actually ride upon the beds and crowd against the beds. In FIGURES 9 and 10, four such cone-shaped guide wheels have been provided, two of which face in one direction and two of which face in the opposite direction to hold the tool carrier in the proper position as it travels down the rows. The cone-shaped guide wheels serve to keep the tool carrier true with respect to the beds and the rows of plants on the beds so that very precise cultivating operations can be carried on without endangering the plants.

The depth to which cultivation is carried on is determined by the ground engaging wheels 31. The frame is merely lowered sufficiently by the ground engaging wheels so that cultivation will be carried on at the proper depth. Even though the tool carrier must be raised at the end of the rows, the tool carrier can be readily lowered into the ground and it will cultivate to the same precise depth because of the bolt 72 carried by the extension bar 61 which engages the upstanding bars 68 as shown particularly in FIGURE 9. This bolt 72 serves to take the pressure off of the hydraulic ram so that the ram need only be utilized for raising and lowering the tool carrier.

Figure 17:
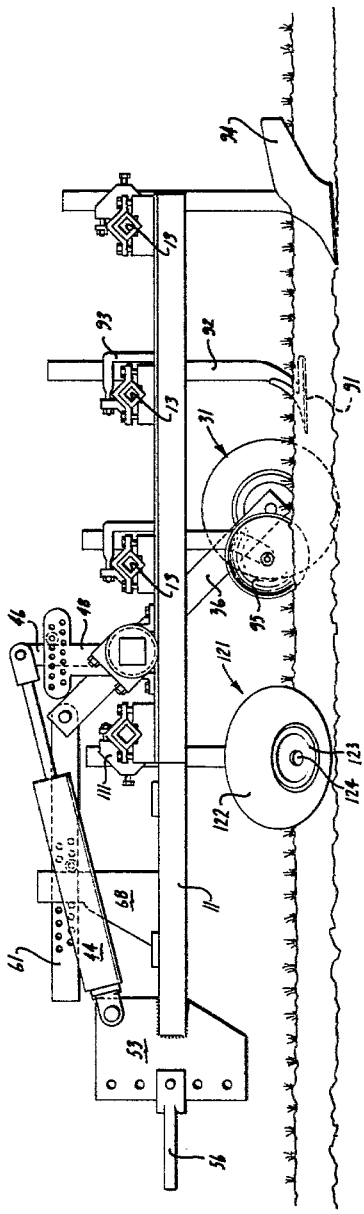
FIGURE 17 is a side elevational view of another agricultural tool carrier incorporating my invention and utilizing a different type of guide wheel.
Figure 18:
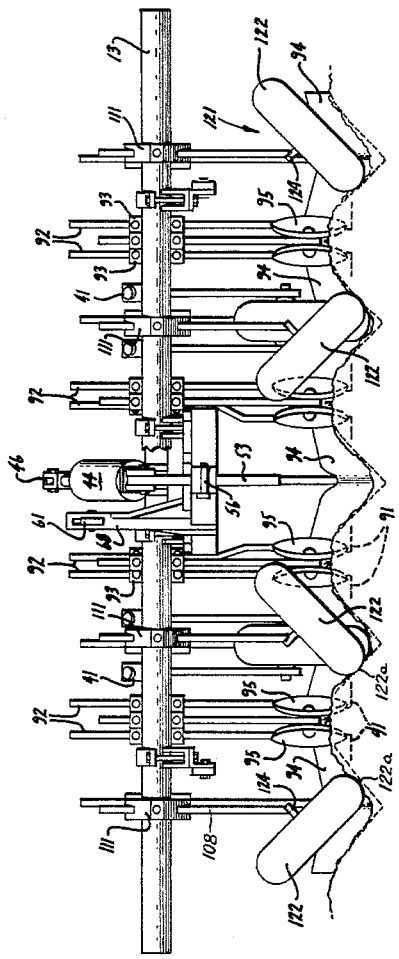
FIGURE 18 is a front elevational view of the agricultural tool carrier shown in FIGURE 17.

In FIGURES 17 and 18, there is shown a different type of means for guiding the agricultural tool carrier as it travels down the furrows. This means consists of rubber-tired wheels 121. The rubber-tired wheels 121 are comprised of a rubber tire 122 which is removably mounted on a rim 123. The rim 123 is rotatably mounted upon a stub axle 124 in a suitable manner. The stub axle is secured to the vertical support bar 108 in a suitable manner such as welding so that it extends at an angle which is substantially parallel with a side of the bed over which the tool carrier is to travel as, for example, an angle of approximately 45°. With the stub axle positioned in this manner, it can be seen that each of the tires 122 is provided with a surface 122a which is inclined at a substantial angle and is positioned so that it can ride upon the side of a bed as shown particularly in FIGURE 18 in a position which is below the crest of the bed and above the valley between two beds. It will be noted, as shown particularly in FIGURE 18, that although guiding can be accomplished with only two of the wheels 121, two pairs have been provided. The wheels are positioned so that certain of the wheels ride upon the sides of the bed inclined in one direction and other of the wheels ride upon the sides of the bed inclined in an opposite direction so that lateral forces are applied to the tool carrier by the ground engaging wheels 121 to guide the tool carrier laterally of the beds as it is moved longitudinally over the beds.

It can be seen that the ground engaging wheels 121 function in much the same manner as the cone-shaped guide wheels 101 provided in the embodiments hereinbefore described. In certain applications, the use of the ground engaging wheels 121 is preferable to that of the cone-shaped guide wheels 101. This is particularly true if the tool carrier is to travel over relatively hard beds which contain exposed, very hard clods or rocks. Such clods or rocks have a tendency to bend or deform the metal cone-shaped guide wheels 101 because if the rocks or clods protude sufficiently, they will raise the cone-shaped guide wheels so that they assume a substantial portion of the weight of the agricultural tool carrier to cause bending or distortion of the guide wheels to such an extent that they no longer properly perform their guiding function.

By utilizing tires 122 which carry a relatively low pressure as the guide means, a tire when it encounters and rolls over an obstruction such as a rock or a hard clod will be deformed to accommodate the rock or clod without raising of the agricultural tool carrier. As soon as the tire has travelled over the obstruction, it will assume its normal shape and perform its normal guiding function.

The use of rubber tires also has an advantage over the cone-shaped guide wheels 101 particularly when traveling over hard ground in that if a clod or a rock is encountered, the tire will be deformed and will flatten out so that the tool carrier will not be raised to permit the tools to travel at the same depth. With the cone-shaped guide wheels, the tools could possibly be lifted out of the ground when an obstruction is encountered.

Although I have only described a few type of tools which can be utilized with my tool carrier, it is readily apparent that many other types of ground working tools can be utilized. In addition, poisons, fertilizers, and the like can be applied by different types of tools. When it is necessary to carry exceptionally heavy loads on the tool carrier, it may be desirable to provide additional ground engaging wheels which are mounted on the rockshaft in the same manner as the two wheels hereinbefore described.

From the construction described, it can be seen that the tools can be readily changed without difficulty. It has been found that if it is desired to obtain additional height as, for example, when cultivating large plants, the angles 12 can be removed from the bars 11 and the angles turned upside down and again secured to the bars so that the leg of the angle which is not attached to the bars faces downwardly rather than upwardly. The tool bars can then be fixed below the angles 11 to give this additional height. For the smaller tool carriers, I have found that it is possible to eliminate the rockshaft, the ground engaging wheels and the hydraulic ram and to provide a three-point attachment of the type well known to those skilled in the art for connecting the tool carrier to the tracor. The three-point hitch on the tractor is then utilized for raising and lowering the tool carrier.

It is apparent from the foregoing that I have provided a new and improved tool carrier which is particularly adapted for bed shaping, planting, cultivating and other similar operations. The tool carrier is very versatile in that it can be adjusted for various sizes of beds. It can be adjusted for skip row planting and cultivation. It is also constructed in such a manner that it can carry a large number of tools without difficulty, thus making it possible to accomplish multiple operations at the same time.

I claim:

1. In an agricultural tool carrier, a plurality of spaced frame members, a plurality of spaced tools bars removably mounted on said frame members, a rock shaft rotatably mounted on said frame members, at least two ground engaging wheels rigidly mounted on the rock shaft and spaced from the rock shaft, means including a lever arm pivotally mounted with respect to the rock shaft for adjusting the angular position of the rock shaft and the wheels mounted thereon with respect to the frame members to determine the elevation of the frame members and the tool bars mounted thereon, and means for adjusting the range of movement of the rock shaft, said means for adjusting the range of movement of the rock shaft including a member rigidly secured to the rock shaft and means adjustably positioned on said member rigidly secured to the rock shaft and adapted to be engaged by the lever arm to limit the angular movement of the rock shaft in one direction, an additional member affixed to said rock shaft, and means connected to said additional member and to said frame members to limit the rotation of the rock shaft in the opposite direction.

2. An agricultural tool carrier as in claim 1 wherein said tool bars are rectangular in cross section and wherein said tool bars are removably mounted on the frame members by bar clamps, said bar clamps including a mounting block, said mounting block having a U-shaped cut-out adapted to receive the tool bar and retain it in a predetermined position, and a V-shaped cut-out opening into the U-shaped cut-out and adapted to receive the bar to hold it in a position which is substantially different from said predetermined position, and clamping means for securing the tool bar within either of the cut-outs.

3. An agricultural tool carrier as in claim 2 wherein said clamping means includes a clamping member having a V-shaped recess adapted to receive the tool bar in either of said positions.

4. An agricultural tool carrier as in claim 1 together with at least two additional ground engaging wheels, independent means rigidly securing each of the additional ground engaging wheels to the frame members, each of said additional ground engaging wheels having a surface inclined at a substantial angle and adapted to engage the earth over which the agricultural tool carrier travels, certain of said surfaces being inclined at one angle and other of the surfaces being inclined at a substantially different angle and serving to apply lateral forces to the tool carrier for guiding the tool carrier as it travels over the earth, said rock shaft being movable to raise said additional ground engaging wheels.

5. A tool carrier as in claim 1 together with a plurality of bed shapers mounted on said tool bars, said bed shapers being formed in two half sections, means for securing the two half sections into a unitary assembly, said last named means permitting lateral adjustment of the said half sections with respect to each other to adjust the width of the beds formed by the bed shapers.

6. A tool carrier as in claim 5 wherein the bed shapers are mounted on the tool bars by substantially vertical supporting bars pivotally connected to the bed shapers, and bar clamps mounted on the tool bars for securing the vertical supporting bars to the tool bars, said bar clamps permitting vertical adjustment of the supporting bars, said bar clamps being adjustable longitudinally of the tool bars to permit lateral adjustment of each half section with respect to the tool bar.

7. In an agricultural tool carrier, a plurality of spaced frame members, a plurality of spaced tool bars removably mounted on said frame members, a rock shaft rotatably mounted on said frame members, at least two ground engaging wheels rigidly mounted on the rock shaft and spaced from the rock shaft, a member rigidly secured to the rock shaft, a hydraulic ram, means securing one end of the hydraulic ram to the frame members, a lever arm, means pivotally connecting the lever arm to the other end of the ram, means connecting the lever arm to said member secured to the rock shaft, and cooperative means associated with the member secured to the rock shaft and the lever arm to cause conjoint movement of the lever arm and the member secured to the rock shaft when the lever arm has been pivoted beyond a predetermined angle with respect to the member secured to the rock shaft, said member secured to the rock shaft being in the form of a plate, said cooperative means consisting of stop means adjustably mounted on the plate and adapted to be engaged by the lever arm.

8. In an agricultural tool carrier, a plurality of spaced frame members, a plurality of spaced tool bars removably mounted on said frame members, a rock shaft rotatably mounted on said frame members, at least two ground engaging wheels rigidly mounted on the rock shaft and spaced from the rock shaft, a member rigidly secured to the rock shaft, a hydraulic ram, means securing one end of the hydraulic ram to the frame members, a lever arm, means pivotally connecting the lever arm to the other end of the ram, means pivotally connecting the lever arm to said member secured to the rock shaft and cooperative means associated with the member secured to the rock shaft and the lever arm to cause conjoint movement of the lever arm and the member secured to the rock shaft when the lever arm has been pivoted beyond a predetermined angle with respect to the member secured to the rock shaft, an additional member affixed to said rock shaft, an adjustment member mounted on the frame, cooperative means associated with said additional member and said adjustment member secured to the frame members for limiting angular movement of the rock shaft in one direction to relieve the loading on of said hydraulic ram, said adjustment member being in the form of a guide member said cooperative means being connected to the additional member engaging the adjustment member and consisting of an elongate member having one end pivotally connected to the additional member and having the other end extending through the guide member, and stop means adjustably positioned on the elongate member and adapted to engage the guide member.

References Cited by the Examiner

UNITED STATES PATENTS

| | | | |
|---|---|---|---|
| 312,489 | 2/1885 | Meikle | 172—507 |
| 1,360,531 | 11/1920 | Hyatt. | |
| 1,950,023 | 3/1934 | Allen | 172—675 |
| 2,464,615 | 3/1949 | Sawall | 172—413 XR |
| 2,691,930 | 10/1954 | Forgy | 172—328 |
| 2,734,440 | 2/1956 | Davis | 172—691 |
| 2,765,609 | 10/1956 | Oehler et al. | 172—328 |
| 2,804,033 | 8/1957 | Burroughs | 111—3 |
| 2,975,842 | 3/1961 | Mostrong | 172—701 |
| 2,998,853 | 9/1961 | Martensen | 172—382 |
| 3,014,541 | 12/1961 | Oehler et al. | 172—501 X |
| 3,042,121 | 7/1962 | Broetzman et al. | 172—413 X |

FOREIGN PATENTS 10,021  1886  Great Britain.

ABRAHAM G. STONE, *Primary Examiner.*

THEODORE G. CRAVER, *Examiner.*

GEA HALVOSA, H. B. HENRY, *Assistant Examiners.*